United States Patent
Min et al.

(10) Patent No.: US 12,518,851 B2
(45) Date of Patent: *Jan. 6, 2026

(54) BINDING PEPTIDE GENERATION FOR MHC CLASS I PROTEINS WITH DEEP REINFORCEMENT LEARNING FOR IMMUNOTHERAPY DECISION MAKING

(71) Applicant: NEC Laboratories America, Inc., Princeton, NJ (US)

(72) Inventors: Renqiang Min, Princeton, NJ (US); Hans Peter Graf, South Amboy, NJ (US); Ziqi Chen, Columbus, OH (US)

(73) Assignee: NEC Corporation, Tokyo (JP)

( * ) Notice: Subject to any disclaimer, the term of this patent is extended or adjusted under 35 U.S.C. 154(b) by 690 days.

This patent is subject to a terminal disclaimer.

(21) Appl. No.: 17/899,004

(22) Filed: Aug. 30, 2022

(65) Prior Publication Data
US 2023/0085160 A1    Mar. 16, 2023

Related U.S. Application Data

(60) Provisional application No. 63/241,129, filed on Sep. 7, 2021.

(51) Int. Cl.
*G16B 15/00* (2019.01)
*G16B 35/00* (2019.01)
*G16B 40/20* (2019.01)

(52) U.S. Cl.
CPC ............ *G16B 15/00* (2019.02); *G16B 35/00* (2019.02); *G16B 40/20* (2019.02)

(58) Field of Classification Search
None
See application file for complete search history.

(56) References Cited

U.S. PATENT DOCUMENTS

| | | | |
|---|---|---|---|
| 2008/0021686 A1* | 1/2008 | Jojic | G16B 40/30 703/11 |
| 2021/0012858 A1* | 1/2021 | Yamashita | G16B 15/30 |
| 2021/0284738 A1* | 9/2021 | Yang | C07K 16/2833 |
| 2021/0383892 A1* | 12/2021 | Holzer | G16H 50/70 |
| 2022/0327425 A1* | 10/2022 | Min | G16B 40/20 |

(Continued)

OTHER PUBLICATIONS

O'Donnell, T. J., Rubinsteyn, A., & Laserson, U. (Jul. 22, 2020). MHCflurry 2.0: improved pan-allele prediction of MHC class I-presented peptides by incorporating antigen processing. Cell systems, 11(1), 42-48.

*Primary Examiner* — Miya J Cato
(74) *Attorney, Agent, or Firm* — Vincent Duffy; Joseph Kolodka

(57) ABSTRACT

A method for generating binding peptides presented by any given Major Histocompatibility Complex (MHC) protein is presented. The method includes, given a peptide and an MHC protein pair, enabling a Reinforcement Learning (RL) agent to interact with and exploit a peptide mutation environment by repeatedly mutating the peptide and observing an observation score of the peptide, learning to form a mutation policy, via a mutation policy network, to iteratively mutate amino acids of the peptide to obtain desired presentation scores, and generating, based on the desired presentation scores, qualified peptides and binding motifs of MHC Class I proteins.

20 Claims, 7 Drawing Sheets

(56) References Cited

U.S. PATENT DOCUMENTS

| | | | |
|---|---|---|---|
| 2023/0282304 A1* | 9/2023 | Dhanik | C12N 15/1037 |
| | | | 702/19 |
| 2024/0071563 A1* | 2/2024 | Min | G16B 15/00 |
| 2024/0087672 A1* | 3/2024 | Min | G16B 40/20 |
| 2024/0087673 A1* | 3/2024 | Min | G16B 15/00 |
| 2024/0153591 A1* | 5/2024 | Choi | G16B 20/00 |

* cited by examiner

```
                            START
                              │
                              ▼
┌─────────────────────────────────────────────────────────────────┐
│ Given a peptide and an MHC protein pair, enable a Reinforcement │
│ Learning (RL) agent to interact with and exploit a peptide      │──1001
│ mutation environment by repeatedly mutating the peptide and     │
│ observing an observation score of the peptide                   │
└─────────────────────────────────────────────────────────────────┘
                              │
                              ▼
┌─────────────────────────────────────────────────────────────────┐
│ Learn to form a mutation policy, via a mutation policy network, │──1003
│ to iteratively mutate amino acids of the peptide to obtain      │
│ desired presentation scores                                     │
└─────────────────────────────────────────────────────────────────┘
                              │
                              ▼
┌─────────────────────────────────────────────────────────────────┐
│ Generate, based on the desired presentation scores, qualified   │──1005
│ peptides and binding motifs of MHC Class I proteins             │
└─────────────────────────────────────────────────────────────────┘
                              │
                              ▼
                             END
```

FIG. 7

BINDING PEPTIDE GENERATION FOR MHC CLASS I PROTEINS WITH DEEP REINFORCEMENT LEARNING FOR IMMUNOTHERAPY DECISION MAKING

RELATED APPLICATION INFORMATION

This application claims priority to Provisional Application No. 63/241,129 filed on Sep. 7, 2021, the contents of which are incorporated herein by reference in their entirety.

BACKGROUND

Technical Field

The present invention relates to peptide generation and, more particularly, to binding peptide generation for Major Histocompatibility Complex (MHC) class I proteins with deep reinforcement learning.

Description of the Related Art

Foreign peptides bound to Major Histocompatibility Complex (MHC) class I proteins and presented on cell surfaces play a vital role in immunotherapy. These peptides can be recognized by T cell receptors to trigger an adaptive immune response. To identify these peptides, many computational tools that predict the binding affinities between peptides and MHC class I proteins have been developed. However, using these tools to exhaustively screen peptides that can be presented by given MHC proteins for identifying binding motifs is challenging, considering the huge search space ranging from 208 to 2015 for peptides with a length of 8~15.

SUMMARY

A method for generating binding peptides presented by any given Major Histocompatibility Complex (MHC) protein is presented. The method includes, given a peptide and an MHC protein pair, enabling a Reinforcement Learning (RL) agent to interact with and exploit a peptide mutation environment by repeatedly mutating the peptide and observing an observation score of the peptide, learning to form a mutation policy, via a mutation policy network, to iteratively mutate amino acids of the peptide to obtain desired presentation scores, and generating, based on the desired presentation scores, qualified peptides and binding motifs of MHC Class I proteins.

A non-transitory computer-readable storage medium comprising a computer-readable program for generating binding peptides presented by any given Major Histocompatibility Complex (MHC) protein is presented. The computer-readable program when executed on a computer causes the computer to perform the steps of, given a peptide and an MHC protein pair, enabling a Reinforcement Learning (RL) agent to interact with and exploit a peptide mutation environment by repeatedly mutating the peptide and observing an observation score of the peptide, learning to form a mutation policy, via a mutation policy network, to iteratively mutate amino acids of the peptide to obtain desired presentation scores, and generating, based on the desired presentation scores, qualified peptides and binding motifs of MHC Class I proteins.

A system for generating binding peptides presented by any given Major Histocompatibility Complex (MHC) protein is presented. The system includes a memory and one or more processors in communication with the memory configured to, given a peptide and an MHC protein pair, enable a Reinforcement Learning (RL) agent to interact with and exploit a peptide mutation environment by repeatedly mutating the peptide and observing an observation score of the peptide, learn to form a mutation policy, via a mutation policy network, to iteratively mutate amino acids of the peptide to obtain desired presentation scores, and generate, based on the desired presentation scores, qualified peptides and binding motifs of MHC Class I proteins.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 7 is a block/flow diagram of an exemplary method for generating binding peptides that can be presented by any given MHC protein, in accordance with embodiments of the present invention.

DETAILED DESCRIPTION OF PREFERRED EMBODIMENTS

Figure 1:
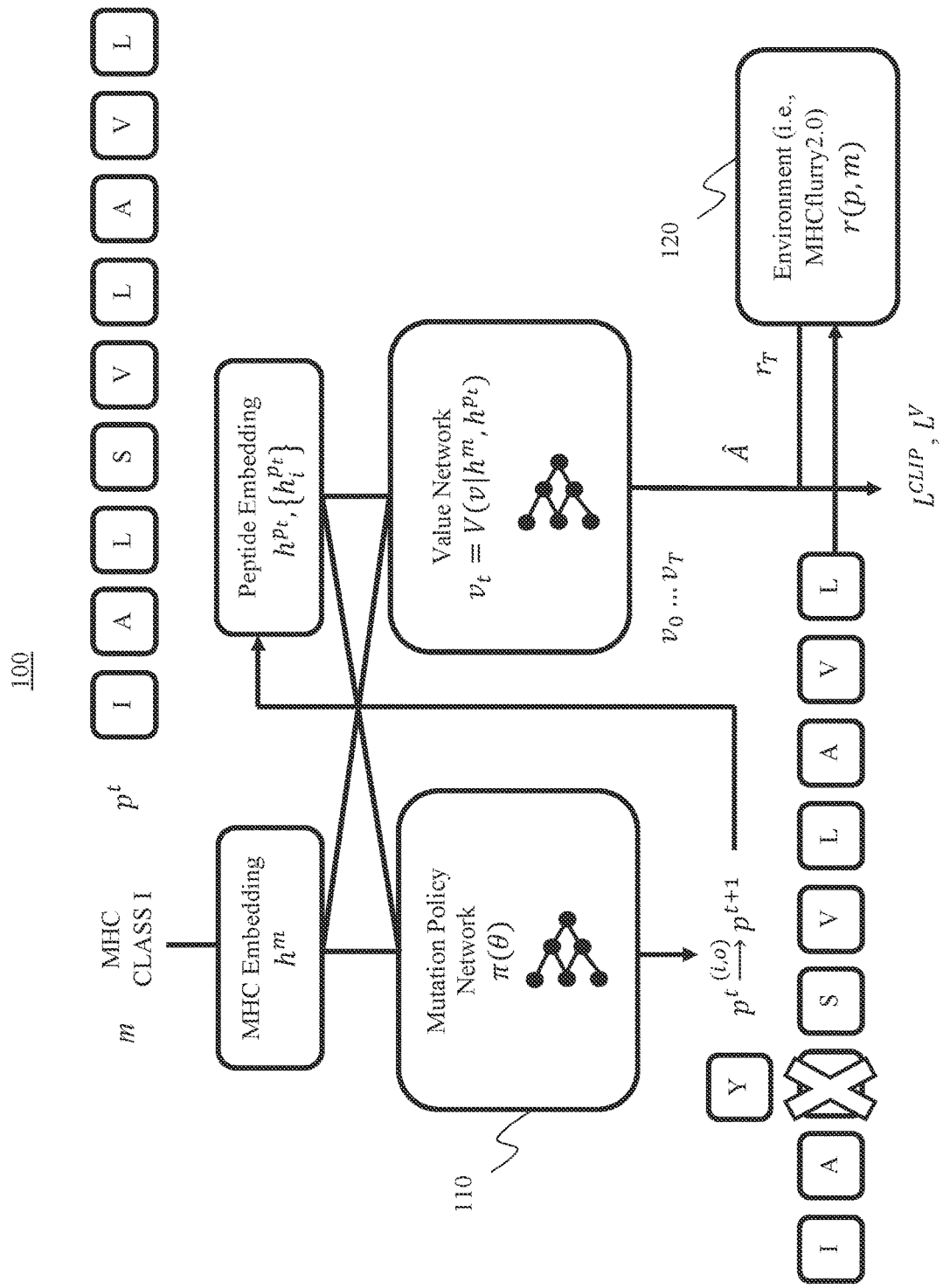
FIG. 1 is a block/flow diagram of an exemplary architecture for generating binding peptides that can be presented by any given Major Histocompatibility Complex (MHC) protein, in accordance with embodiments of the present invention.

Immunotherapy, which aims at boosting a patient's immune system against intracellular pathogens (e.g., viruses or bacteria) and tumor cells, is a fundamental treatment for human diseases. A major branch of such immune responses are triggered by the Cytotoxic T cells (also known as CD8+ T cells) when they recognize foreign peptides presented by Major Histocompatibility Complex (MHC) Class I proteins on the cell surface. To attain recognition, these foreign peptides are first degraded from intracellular antigens by proteolytic enzymes within the proteasome, and then transported to the endoplasmic reticulum to bind to MHC Class I proteins. The resulting peptide-MHC complexes are then moved to the cell surface to interact with the CD8+ T cell receptors.

Leveraging such immune reactions triggered by peptide-MHC complexes has recently shown substantial promise for peptide-based vaccines in the prevention of human diseases. Peptide-based vaccines have better stability and synthesizability when compared with large proteins and may trigger the desired immune responses with fewer side effects.

Despite recent successes, developing peptide-based immunotherapy still confronts a major challenge, that is, how to efficiently identify foreign binding peptides and binding motifs of given MHC proteins. To tackle this challenge, many computational tools predicting the binding affinities between peptides and MHC class I proteins have been developed. However, even with these tools, it is still difficult to directly find the qualified peptides that can be presented by specific MHC proteins. It becomes even more challenging because some MHC proteins have no or limited experimental data due to the high cost to obtain them. In practice, to find all the qualified peptides for binding motif identification with the existing computational tools, it may be needed to exhaustively screen all possible peptides. This screening is time-consuming and costly.

To address such challenge, the exemplary embodiments formulate the foreign peptide search as a Reinforcement Learning (RL) problem and propose a framework, referred to as PepPPO, to generate qualified peptides and peptide binding motifs. Leveraging the RL agent, the PepPPO learns a mutation policy to optimize the peptides through mutating amino acids, step by step, such that the mutated peptides can be presented by a given MHC protein. The exemplary embodiments demonstrate that PepPPO can significantly outperform multiple baselines in terms of finding qualified peptides and can effectively generate binding motifs of MHC proteins. Promisingly, the generated motifs are highly robust, with random initial peptides leading to identical motifs after stepwise mutations and are highly correlated with experimentally derived motifs. Furthermore, it is demonstrated that motifs generated by PepPPO can be used in rapid screening for neoantigens through motif matching even for rare MHC class I proteins without experimental data.

A peptide is represented as a sequence of amino acids $<o_1, o_2, \ldots, o_i, \ldots, o_l>$, where o is one of 20 types of natural amino acids and/is the length of the sequence ranging from 8~15. Given an MHC protein m that is another sequence of amino acids, PepPPO 100 (FIG. 1) aims at generating a binding peptide p of length/that will be presented by m.

To this end, PepPPO 100 leverages a reinforcement learning (RL) agent to explore (interact with) the peptide mutation environment 120 for high-presentation peptide generation. In a nutshell, given a peptide and an MHC protein pair (p, m), the RL agent explores and exploits the peptide mutation environment 120 by repeatedly mutating the current peptide and observing its presentation score. Through such trial-and-error processes, the RL agent learns to form a mutation policy π(·) to iteratively mutate the amino acids of any given peptide p to have a desired presentation score. This learning paradigm is illustrated in FIG. 1, and there are two main components to fulfill the learning, that is, constructing the peptide mutation environment 120 and learning the mutation policy network 110, which will be described below.

The peptide mutation environment 120 enables the RL agent to perform and experience trial-and-error peptide mutations to gradually refine its mutation policy (through tuning the parameters of the mutation policy networks). During learning, the RL agent keeps mutating peptides and receiving their presentation scores (i.e., reward signal) given by the environment. These rewards thus help reinforce the agent's mutation behaviors. For instance, mutation behaviors resulting in high peptide presentation scores (high rewards) are encouraged while others leading to low scores arc discouraged.

The mutation environment 120 includes three components, that is, a state space, an action space and a reward function. The state includes the current mutated peptide and the MHC protein. The action and the reward represent the mutation action that may be taken by the RL agent and the resulting new presentation score of the mutated peptide, respectively.

Regarding the state space, the exemplary embodiments define the state of the environment $s_t$ at time step t as a pair including a peptide and an MHC class I protein (p, m). The exemplary embodiments represent an MHC protein as a pseudo sequence with 34 amino acids, each of which is in potential contact with the bound peptide within a distance of 4.0 Å, following the previous work for peptide-MHC binding prediction. With a peptide of length/and an MHC protein, the exemplary embodiments represent the state s; as a tuple $s_t=(E^p, E^m)$, in which $E^p$ and $E^m$ are the encoding matrices of the peptide and the MHC protein, respectively. For training, the exemplary embodiments initialize the state $s_0$ by randomly sampling an MHC class I protein and a peptide sequence. The exemplary embodiments define the terminal state $s_T$, which will stop mutating a peptide, as the state either with the maximum time step T reached by the RL agent or with the presentation score greater than a predefined threshold σ.

Regarding the action space, the exemplary embodiments define a multi-discrete action space to optimize the peptide by replacing one amino acid with another one. Specifically, at time step t, given a peptide $p_t=<o_1, o_2, \ldots, o_l>$, the action for the RL agent is to first determine the position of the amino acid to be replaced, and then predict the type of new amino acid at that position.

Regarding the reward design, the exemplary embodiments use the final reward to guide the optimization of the RL agent. That is, only the terminal states can receive rewards from the peptide mutation environment 120. The exemplary embodiments define the final reward as the presentation score $r(p_T, m)$ between the peptide $p_T$ and the MHC protein m in the terminal state $s_T$. To this end, the exemplary embodiments leverage the presentation score predicted by the MHCflurry2.0 for learning. MHCflurry2.0 is the best existing method able to accurately estimate the presentation scores of peptides with MHC proteins. This score is a composite score of the antigen processing (AP) prediction and the binding affinity (BA) prediction. The former predicts the probability for a peptide to be delivered by the transporter associated with antigen processing (TAP) protein complex into the endoplasmic reticulum (ER), where the peptide can bind to MHC proteins. The latter predicts the binding strength between the peptide and MHC protein. Higher presentation scores require higher AP and BA scores and indicate higher probabilities for peptides to be presented on the cell surface by the given MHC proteins.

Regarding the mutation policy network 110, to learn the mutation policy, the RL agent in the PepPPO 100 takes as input the given peptide and the MHC protein. The agent then learns to mutate the amino acids in the peptide sequence, one amino acid at each step, aiming at maximizing the presentation score of the resulting peptide. In PepPPO 100, both the peptide and the MHC protein are first encoded into a distributed embedding space. Then, a mapping between the embedding space and the mutation policy is learned by a gradient descent optimization method, as discussed below.

Regarding encoding of amino acids, the exemplary embodiments use a mixture of multiple encoding methods to represent the amino acids within the peptide sequences and the MHC proteins. The exemplary embodiments represent each amino acid by concatenating the encoding vectors $e^B$, $e^O$ and $e^D$ from the BLOSUM matrix, the one-hot matrix and the learnable embedding matrix, respectively, that is, $e = e^B \oplus e^O \oplus e^D$ and $e \in \mathbb{R}^d$. This method has been demonstrated to achieve the best prediction performance on peptide-MHC binding prediction among all the combinations of these encoding methods.

The encoding matrices $E^P$ and $E^m$ of the peptide p and the MHC protein m are then represented as $E^P = \{e_1; \ldots; e_l\} \in \mathbb{R}^{l \times d}$ and $E^m = \{e_1; \ldots; e_{34}\} \in \mathbb{R}^{34 \times d}$, respectively.

Regarding embedding of states, to predict the mutation of amino acids in peptide sequences, the exemplary embodiments first embed each amino acid $o_i$ within the peptide sequences $<o_1, o_2, \ldots, o_l>$ into a continuous latent vector $h_i$ using one-layer bidirectional LSTM as below:

$$\vec{h}_i, \vec{c}_i = LSTM(e_i, \vec{h}_{i-1}, \vec{c}_{i-1}; \vec{W}^P),$$

$$\overleftarrow{h}_i, \overleftarrow{c}_i = LSTM(e_i, \overleftarrow{h}_{i-1}, \overleftarrow{c}_{i-1}; \overleftarrow{W}^P),$$

$$h_i = \vec{h}_i \oplus \overleftarrow{h}_i,$$
(1)

where $\vec{h}_i / \overleftarrow{h}$ are the hidden state vectors of the i-th amino acid, $\vec{c}/\overleftarrow{c}$ are the memory cell states of the i-th amino acid, and $\vec{h}$, $\overleftarrow{h}$, $\vec{c}_0$ and, $\overleftarrow{c}$ are initialized with random noise vectors. $\vec{W}^P$ and $\overleftarrow{W}^P$ are the learnable parameters of the LSTM for the forward and backward direction, respectively. With the embeddings of all the amino acids, the exemplary embodiments define the embedding of the peptide sequence as the concatenation of hidden vectors at two ends, namely: $h^P = \vec{h}_l \oplus \overleftarrow{h}$.

To embed an MHC protein into a continuous latent vector, the exemplary embodiments first flatten the encoding matrix $E^m$ into a vector m. Then, the exemplary embodiments learn the continuous latent embedding $h^m$ as:

$$h^m = W_1^m \text{ReLU}(W_2^m m),$$
(2)

where $W_\ell^m (\ell=1, 2)$ are the learnable parameter matrices.

Regarding action prediction, at each time step t, the exemplary embodiments optimize the peptide sequence $p_t$ by predicting the mutation of one amino acid with the latent embeddings $h^P$ and $h^m$. Specifically, the exemplary embodiments first select the amino acid $o_i$ in $p_t$ as the one to be replaced. The exemplary embodiments then predict which amino acid should be used to replace $o_i$. For each amino acid $o_i$ in the peptide sequence, the exemplary embodiments predict the score of replacement as shown below:

$$f^c(o_i) = (w^c)^T(\text{ReLU}(W_1^c h_i + W_2^c h^m)),$$
(3)

where $h_i$ is the hidden latent vector of $o_i$, $w^c$ and $w_\ell^c (\ell=1,2)$ are the learnable vector and matrices, respectively. The exemplary embodiments measure "how likely" the amino acid $o_i$ can be replaced with another one by looking at its context in $h_i$ (e.g., $o_i$ and the peptide sequence $p_t$) and the MHC protein $h^m$. The amino acid to be replaced is determined by sampling from the distribution with normalized scores. The exemplary embodiments then predict the type of the amino acid used to replace $o_i$ as shown below:

$$f^i(o) = \text{softmax}(W_1^d \times \text{ReLU}(W_2^d h_i + W_3^d h^m))$$
(4)

where $W_\ell^d (\ell=1,2,3)$ are the learnable matrices and softmax(·) converts a 20-dimensional vector into probabilities over the 20 amino acid types. The amino acid type is then determined by sampling from the distribution of probabilities of amino acid types excluding the original type of $o_i$.

Regarding learning, and in particular with respect to optimization, the exemplary embodiments adopt the Proximal Policy Optimization (PPO), a policy gradient method to optimize the policy networks.

The objective function of the PPO is defined as follows:

$$\max_\theta L^{CLIP}(\theta) = \hat{\mathbb{E}}_t[\min(r_t(\theta)\hat{A}_t, \text{CLIP}(r_t(\theta), 1-\varepsilon, 1+\varepsilon)\hat{A}_t)],$$
(5)

where $\theta$ is the set of learnable parameters of the policy network and $$r_t(\theta) = \frac{\pi_\theta(a_t|s_t)}{\pi_{\theta_{old}}(a_t|s_t)},$$

which is the probability ratio between the action under current policy $\pi_\theta$ and the action under previous policy $\pi_{\theta_{old}}$. Here, $r_t(\theta)$ is clipped to avoid moving n outside of the interval $[1-\varepsilon, 1+\varepsilon]$. $\hat{A}_t$ is the advantage at timestep t computed with the generalized advantage estimator, measuring how much better the selected actions are than others on average:

$$\hat{A}_t = \delta_t + (\gamma\lambda)\delta_{t+1} + \ldots + (\gamma\lambda)^{T-t+1}\delta_{T-1},$$
(6)

where $\gamma \in (0, 1)$ is the discount factor determining the importance of future rewards, $\delta_t = r_t + \gamma V(s_{t+1}) - V(s_t)$ is the temporal difference error in which $V(s_t)$ is a value function, and $\lambda \in (0, 1)$ is a parameter used to balance the bias and variance of $V(s_t)$. Here, $V(s_t)$ uses a Multi-Layer Perceptron (MLP) to predict the future return of current state $s_t$ from the MHC embedding $h^m$ and the peptide embedding $h^P$.

The objective function of $V(\cdot)$ is defined as follows:

$$\min_\theta L^V(\theta) = \hat{\mathbb{E}}_t[(V(s_t) - \hat{R}_t)^2],$$
(7)

where $$\hat{R}_t = \sum_{i=t+1}^T \gamma^{i-t} r_i$$

is the rewards-to-go. Because only the final rewards are used, that is $r_i=0$ if $i \neq T$, the exemplary methods calculate $$\hat{R}_t = \gamma^{T-t} r_T.$$

The exemplary methods also add the entropy regularization loss $H(\theta)$, a popular strategy used for policy gradient methods, to encourage the exploration of the policy.

Regarding learning, and in particular with respect to informed training with prior knowledge, in order to stabilize the training and improve the performance, the exemplary embodiments derive an expert policy $\pi_{ept}$ from the existing data. Specifically, for each MHC protein m with enough data, the exemplary embodiments calculate the amino acid distributions $\langle p_1(o|m), p_2(o|m), \ldots, p_l(o|m)\rangle$ of peptides with length l.

Given a peptide $p=\langle o_1, o_2, \ldots, o_l\rangle$, the position i is selected as follows:

$$\pi^c_{ept}(p, m) = \arg\max_i (p_i(o = \hat{o}_i|m) - p_i(o = o_i|m)), \quad (8)$$

where $\hat{o}_i$ is the most popular amino acid on position i, that is, $p_i(o=\hat{o}_i|m)=\max_o(p_i(o|m))$. After determining the position, the exemplary embodiments sample the amino acid from the distribution of $o_i'\sim p_i(o|m)$. For an MHC protein without experimental data, its distances with all the MHCs with data are calculated using the BLOSUM62 matrix, and sample actions from the amino acid distributions of the most similar MHC.

The exemplary embodiments utilize the expert policy to pre-train the policy network. The objective of pretraining is to minimize the following cross entropy loss:

$$\min_\theta L^{PRE}(\theta) = \mathbb{E}_{s\sim S}\left[\mathbb{E}_{i\sim\pi^c_{ept}}[\log(\pi^c_\theta(i|s))] + \mathbb{E}_{o\sim\pi^d_{ept}}\left[\log\left(\pi^d_\theta(o|s)\right)\right]\right], \quad (9)$$

where S denotes the state space. In addition to pre-training the policy network, at the beginning of training, the exemplary embodiments also sample actions with the expert policy and use the trajectories with expert actions to update the policy network.

Regarding learning, and in particular with respect to the diversity-promoting experience buffer, to increase the diversity of generated peptides, it is important to find a nondeterministic policy that could produce diverse actions. Such a policy can increase the exploration over a large state space, and, thus, find diverse good actions.

As mentioned earlier, the exemplary embodiments have included the entropy regularization into the objective function to ensure sufficient exploration. However, this strategy cannot explicitly encourage the policy to produce diverse actions that could lead to high rewards. To explicitly enforce the policy to learn diverse actions, the exemplary embodiments design a diversity-promoting experience buffer to store the trajectories that could result in qualified peptides. In detail, at each iteration, the visited state action pairs of mutation trajectories of qualified peptides are added into this buffer. The exemplary embodiments always keep the state-action pairs with infrequent actions and remove those with frequent actions to ensure that the buffer is not dominated by the frequent actions. The exemplary embodiments then randomly sample a batch of state-action pairs with infrequent actions from the buffer.

To encourage the policy network to reproduce these infrequent actions that could induce high rewards, the cross-entropy loss $L^B$ is defined as:

$$L^B = E_{(s,i,o')\sim B}\left[-\sum_{j=1}\mathbb{I}(j=1)\log(\pi^c_\theta(i|s)) - \sum_{o_i}\mathbb{I}(o_i=o')\log\left(\pi^d_\theta(o_i|s)\right)\right] \quad (10)$$

where B represents the diversity-promoting experience buffer and $\mathbb{I}$ represents the indicator function.

The exemplary embodiments then include the above object function into the final objective function as below $$\min_\theta L(\theta) = -L^{CLIP}(\theta) + \alpha_1 L^V(\theta) + \alpha_2 L^B(\theta) - \alpha_3 H(\theta) \quad (11)$$

where $\alpha_\ell$ ($\ell$=1, 2, 3) are pre-defined coefficients.

The experimental dataset of MHC binding affinities was used to derive the amino acid distributions of qualified peptides to get the expert policy for PepPPO 100. This dataset includes 149 human MHC class I proteins (alleles) and 319,971 peptides. 3,688 unique pseudo sequences for MHC proteins were retrieved from a previous publication. It is noted that different MHC proteins could be represented with the same pseudo sequences.

The exemplary embodiments thus present a deep reinforcement learning system with peptide mutation policies for generating binding peptides that are the same as or at most d amino acids different from a library of peptides. The pre-defined library of peptides can be derived from the genome of a virus such as SARS-COV-2 or from sequencing tumor samples of a patient. Therefore, the system 100 can be used for generating peptides for immunotherapy targeting a particular type of virus or tumor. Given a virus genome or some tumor cells, the exemplary methods run sequencing followed by some off-the-shelf peptide processing pipelines to extract a library of peptides that can uniquely identify the virus or tumor cells. Targeting this peptide library from the virus or tumor, the system 100 can generate peptides that bind to MHC and are presented on cell surface, so that immune responses can be triggered to kill the virus or tumor cells.

A deep neural network is first trained on the public IEDB dataset or a pre-trained model such as MHCFlurry 2.0 is employed to predict a peptide presentation score (a combination of peptide-MHC binding affinity and antigen processing score) given a MHC allele sequence and a peptide sequence. Based on this pre-trained model for predicting peptide presentation scores from MHC allele and peptide sequences, the exemplary embodiments develop a DRL system with peptide mutation policies to generate peptides with high presentation scores that are the same as or at most d amino acids different from the provided library of peptides. Specifically, using the prctrained presentation-score prediction deep model to define reward functions and starting from random peptides, the exemplary embodiments then pretrain the DRL system to learn good peptide mutation policies transforming a given random peptide into a peptide with a high presentation score.

Based on this trained DRL system with pretrained peptide mutation policies, the exemplary embodiments randomly sample batches of peptides from the provided library and follow the policy network to mutate the peptides. During the mutation process, if any mutated peptide is already d amino acid different from the starting peptide, the exemplary embodiments stop the process and output the peptide as the final peptide. The exemplary embodiments also optionally finetune the policy network on this library of peptides with the similarity constraint enforced. The exemplary embodiments output the final mutated peptides for all peptides in the library (each peptide in the library might produce several promising mutated peptides satisfying the similarity constraint) and rank the compiled set of mutated peptides. The top ranked peptides are used as promising drug candidates targeting the specified virus or tumor cells for immunotherapy.

Figure 2:
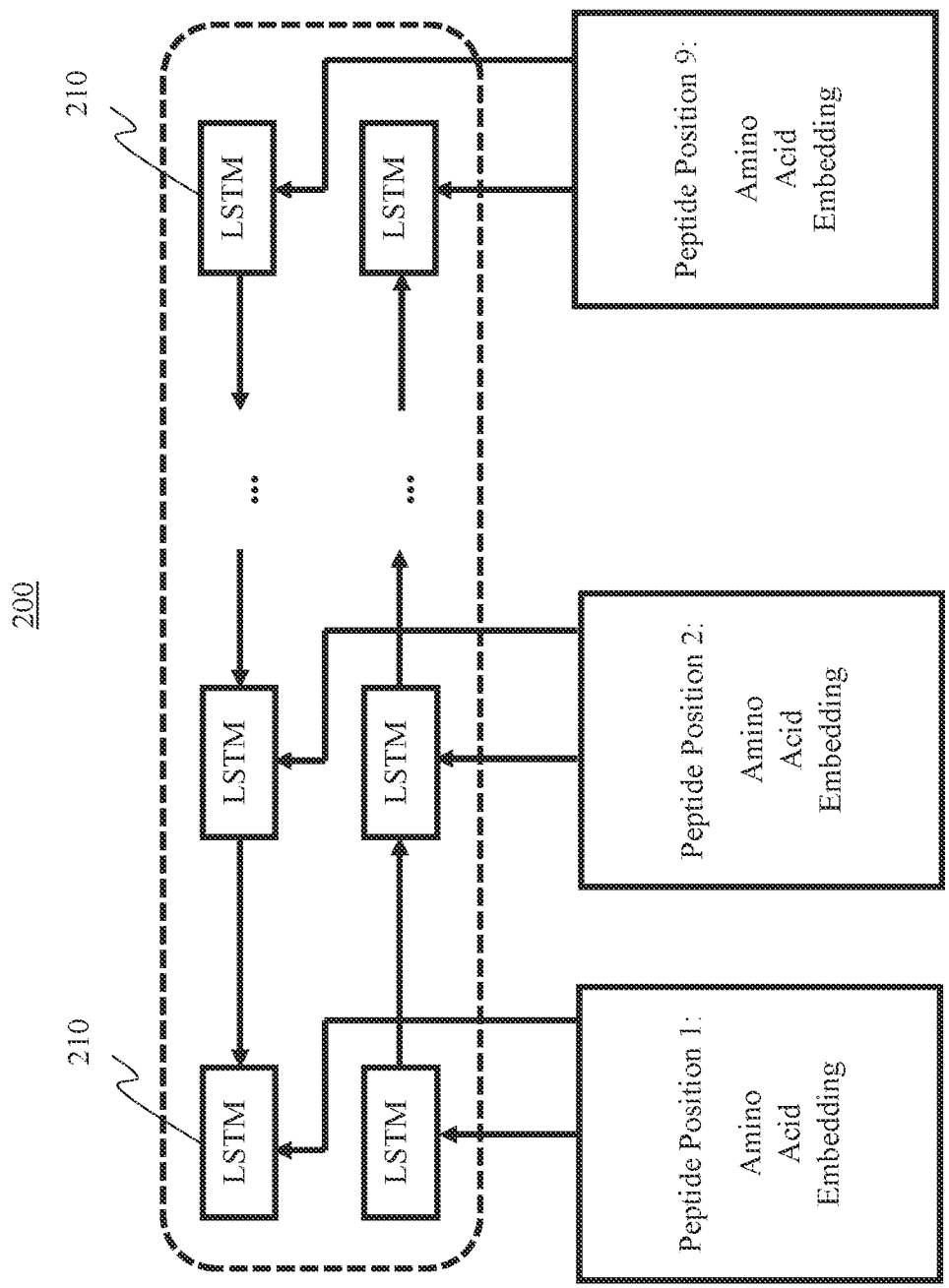
FIG. 2 is a block/flow diagram of an exemplary architecture of a peptide sequence representation network with bi-directional Long Short-Term Memory (LSTM), in accordance with embodiments of the present invention.

FIG. 2 is a block/flow diagram of exemplary architecture 200 of a peptide sequence representation network with bi-directional Long Short-Term Memory (LSTM) 210, in accordance with embodiments of the present invention.

Peptides bound to Human Leukocyte Antigen (HLA) proteins can be identified by the T cell receptor and can trigger an immune response. Given personalized genomics data, peptide-based immunotherapy targeting tumors and viruses are developed, as peptides can help develop personalized immunotherapy. There are 22,346 HLA Class I molecules in total. Only 1% of such HLA Class I molecules have binding affinity measurements (203 out of the 22,346). Peptides bound to MHC Class I are short sequences of amino acids with lengths of about 8~15. The search space for peptides is 2015. Given any MHC Class I molecule, the exemplary embodiments generate peptides that could be presented by it by identifying patterns of qualified peptides for any MHC Class I molecule. Thus, the exemplary embodiments identify qualified peptides and patterns for HLA molecules. The exemplary methods further formulate the peptide generation problem as a search problem. A reinforcement learning (RL) network is developed to solve the problem with includes a mutational policy that can generate diverse peptides and has good interpretability. The exemplary methods can identify the patterns of each MHC allele by counting the frequency of predicted positions and amino acids to mutate random peptides into qualified peptides with RL.

Figure 3:
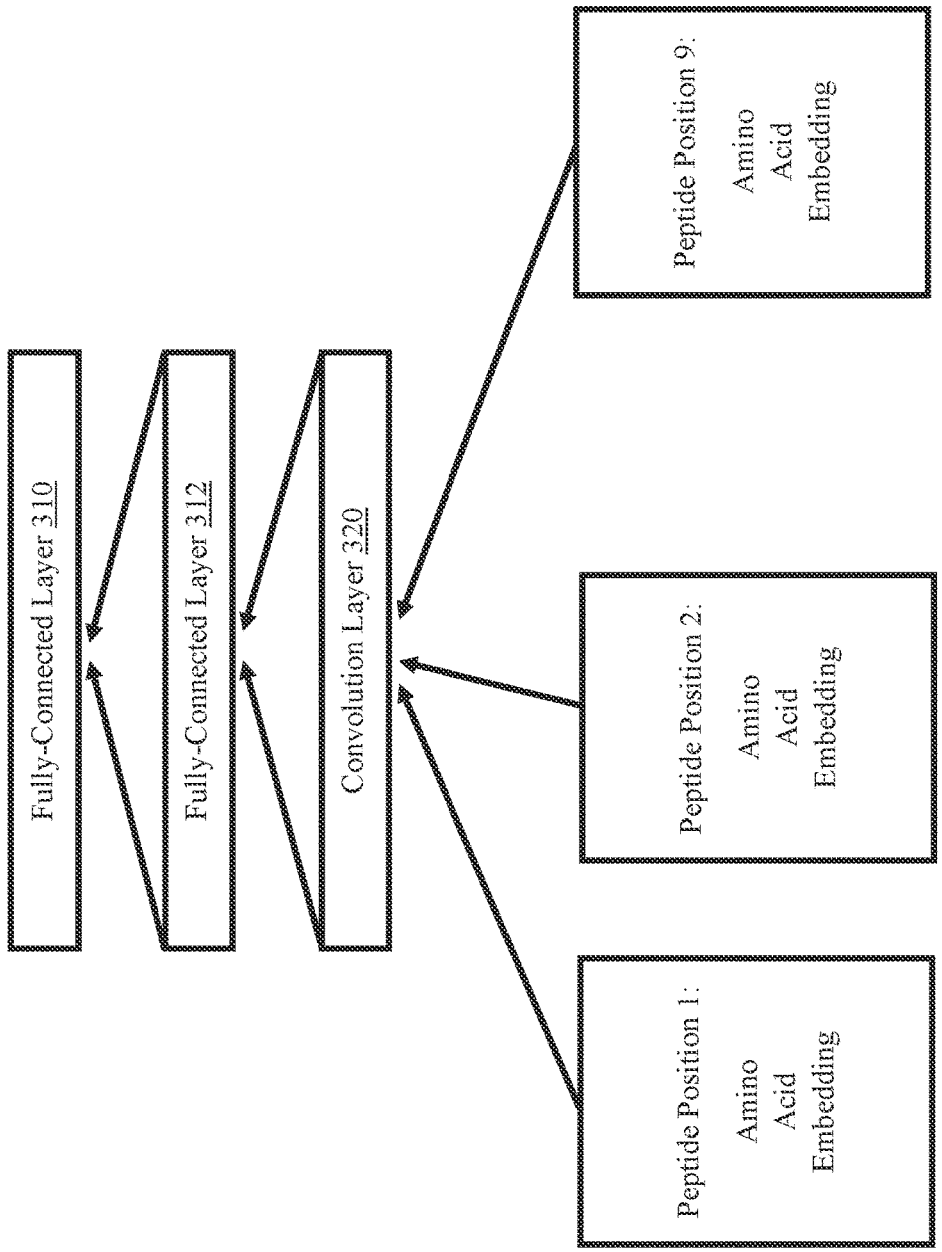
FIG. 3 is a block/flow diagram of an exemplary architecture of a MHC allele representation network, in accordance with embodiments of the present invention.

FIG. 3 is a block/flow diagram of an exemplary architecture 300 of a MHC allele representation network, in accordance with embodiments of the present invention.

The exemplary methods first train a deep neural network on the public IEDB dataset or employ a pre-trained model such as MHCFlurry 2.0 to predict a peptide presentation score (a combination of peptide-MHC binding affinity and antigen processing score) given a MHC allele sequence and a peptide sequence.

Based on this pre-trained model for predicting peptide presentation scores from the MHC allele and peptide sequences, the exemplary methods develop a DRL system with peptide mutation policies to generate peptides with high presentation scores that are the same as or at most d amino acids different from the provided library of peptides. Specifically, using the pretrained presentation-score prediction deep model to define reward functions and starting from random peptides, the exemplary embodiments then pretrain a DRL system to learn good peptide mutation policies transforming a given random peptide into a peptide with a high presentation score.

Based on this trained DRL system with pretrained peptide mutation policies, the exemplary methods randomly sample batches of peptides from the provided library and follow the policy network to mutate the peptides. During the mutation process, if any mutated peptide is already d amino acid different from the starting peptide, the exemplary embodiments stop the process and output the peptide as final peptide. The exemplary methods also optionally finetune the policy network on this library of peptides with the similarity constraint enforced.

The final mutated peptides for all peptides in the library are output (each peptide in the library might produce several promising mutated peptides satisfying the similarity constraint), and the compiled set of mutated peptides are ranked. The top ranked peptides are used as promising drug candidates targeting the specified virus or tumor for immunotherapy.

Thus, with reference to FIGS. 2 and 3, in the RL system, the exemplary methods use amino acid embeddings followed by a convolutional layer 320 and fully-connected layers 310, 312 to get the allele representation, and the exemplary methods further use bi-directional LSTM 210 on top of amino acid embeddings to get peptide representation. Moreover, a deep neural network is used as a policy network to learn the conditional probability of different actions given the state.

Figure 4:
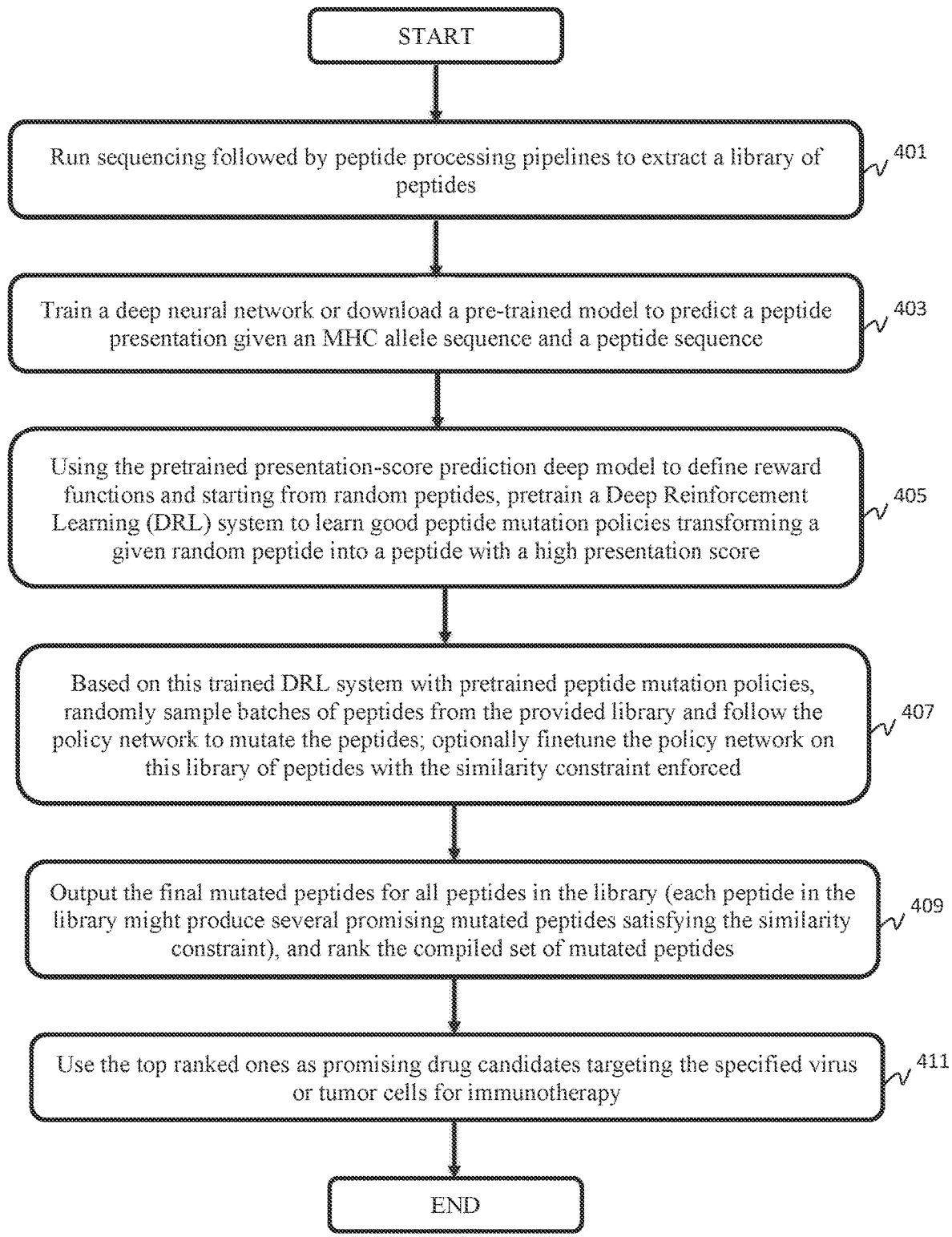
FIG. 4 is a block/flow diagram of an exemplary method for a Deep Reinforcement Learning (DRL) approach to peptide vaccine design for immunotherapy, in accordance with embodiments of the present invention.

FIG. 4 is a block/flow diagram of an exemplary method for a deep reinforcement learning (DRL) approach to peptide vaccine design for immunotherapy, in accordance with embodiments of the present invention.

At block 401, run sequencing followed by peptide processing pipelines to extract a library of peptides.

At block 403, train a deep neural network or download a pre-trained model to predict a peptide presentation given an MHC allele sequence and a peptide sequence.

At block 405, using the pretrained presentation-score prediction deep model to define reward functions and starting from random peptides, pretrain a Deep Reinforcement Learning (DRL) system to learn good peptide mutation policies transforming a given random peptide into a peptide with a high presentation score.

At block 407, based on this trained DRL system with pretrained peptide mutation policies, randomly sample batches of peptides from the provided library and follow the policy network to mutate the peptides. The policy network on this library of peptides is optionally finetuned with the similarity constraint enforced.

At block 409, output the final mutated peptides for all peptides in the library (each peptide in the library might produce several promising mutated peptides satisfying the similarity constraint), and rank the compiled set of mutated peptides.

At block 411, use the top ranked ones as promising drug candidates targeting the specified virus or tumor cells for immunotherapy.

Figure 5:
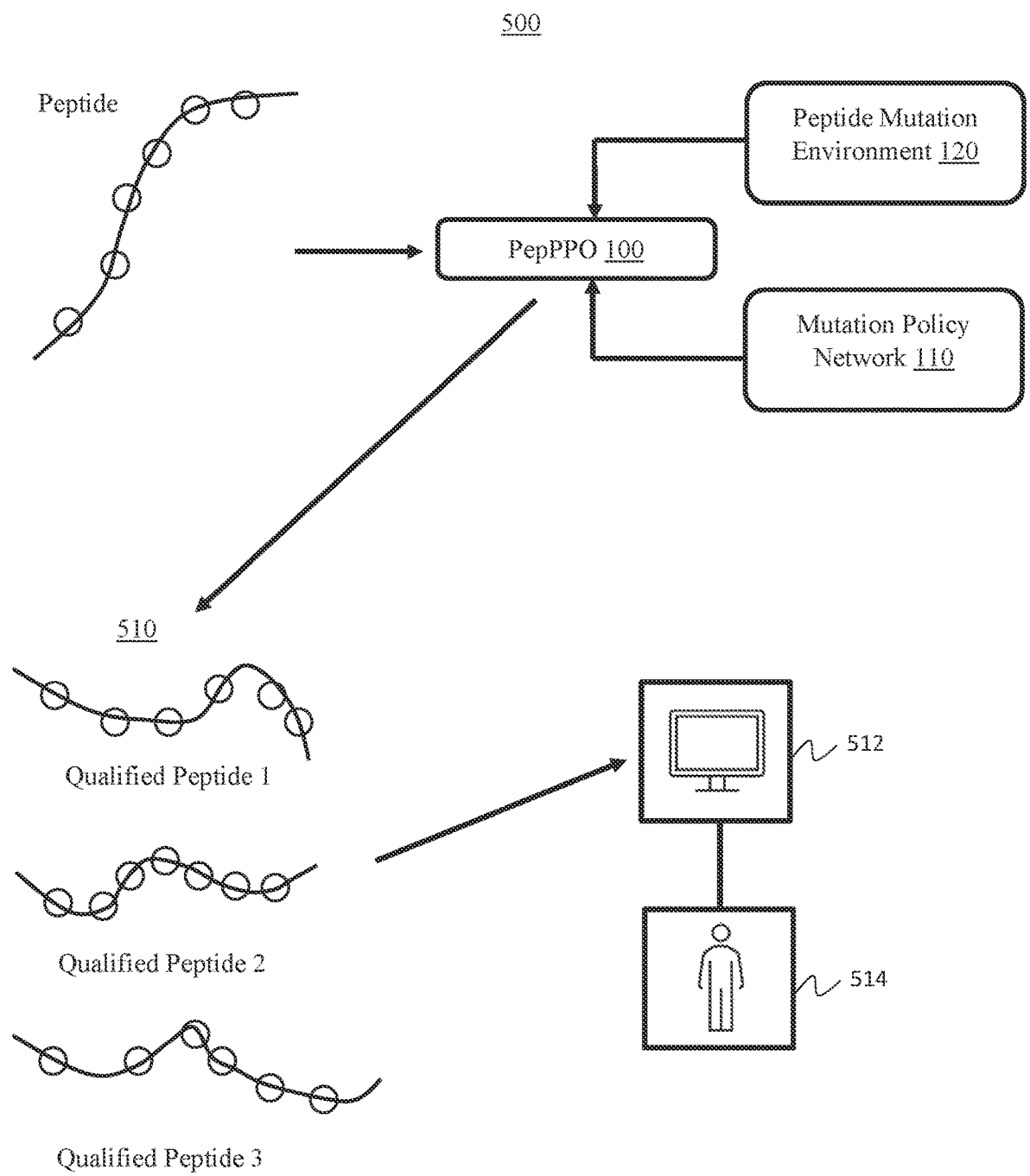
FIG. 5 is an exemplary practical application for generating binding peptides that can be presented by any given MHC protein, in accordance with embodiments of the present invention.

FIG. 5 is an exemplary practical application 500 for generating binding peptides that can be presented by any given MHC protein, in accordance with embodiments of the present invention.

In one practical example 500, a peptide is processed by the PepPPO 100 within the peptide mutation environment 120 by the mutation policy network 120 to generate new qualified peptides 510 to be displayed on a screen 512 and analyzed by a user 514.

Figure 6:
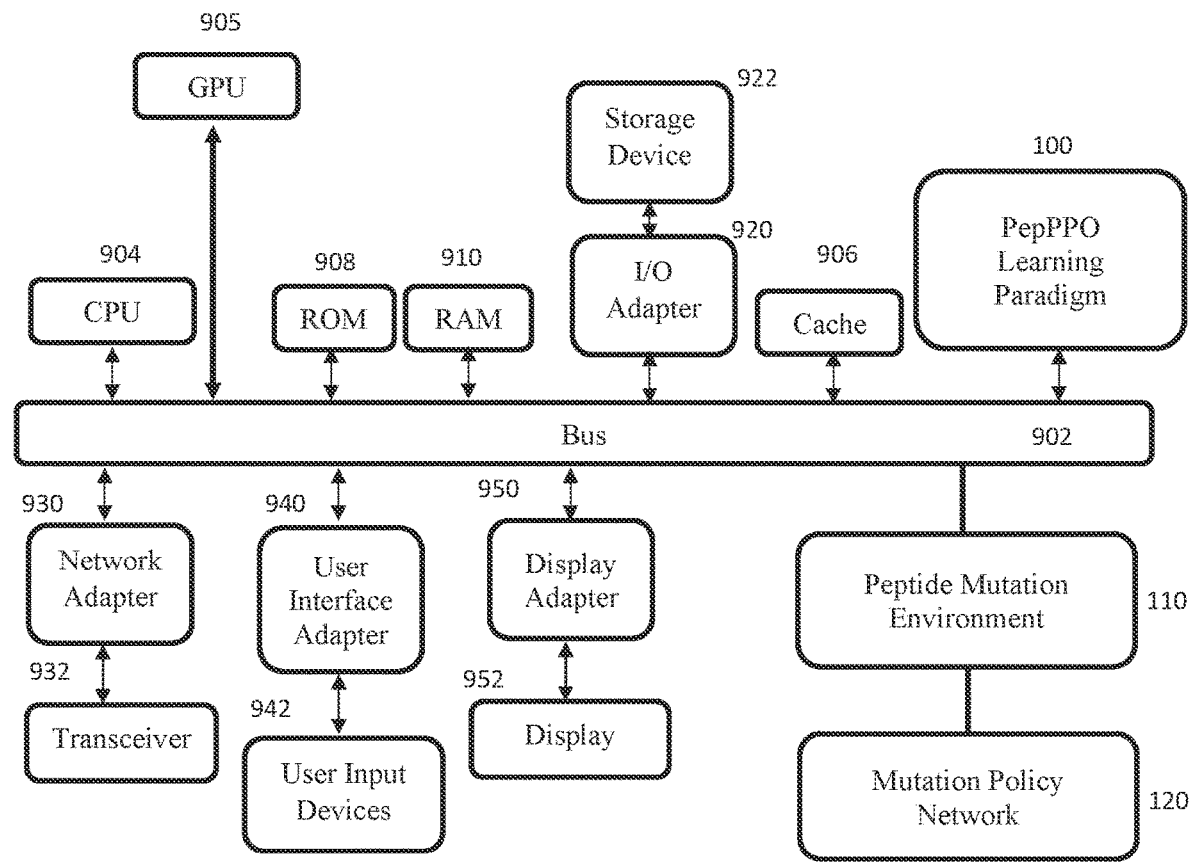
FIG. 6 is an exemplary processing system for generating binding peptides that can be presented by any given MHC protein, in accordance with embodiments of the present invention.

FIG. 6 is an exemplary processing system for generating binding peptides that can be presented by any given MHC protein, in accordance with embodiments of the present invention.

The processing system includes at least one processor (CPU) 904 operatively coupled to other components via a system bus 902. A Graphical Processing Unit (GPU) 905, a cache 906, a Read Only Memory (ROM) 908, a Random Access Memory (RAM) 910, an Input/Output (I/O) adapter 920, a network adapter 930, a user interface adapter 940, and a display adapter 950, are operatively coupled to the system bus 902. Additionally, the PepPPO system 100 employs a mutation policy network 120 in a peptide mutation environment 110.

A storage device 922 is operatively coupled to system bus 902 by the I/O adapter 920. The storage device 922 can be any of a disk storage device (e.g., a magnetic or optical disk storage device), a solid-state magnetic device, and so forth.

A transceiver 932 is operatively coupled to system bus 902 by network adapter 930.

User input devices 942 are operatively coupled to system bus 902 by user interface adapter 940. The user input devices 942 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 942 can be the same type of user input device or different types of user input devices. The user input devices 942 are used to input and output information to and from the processing system.

A display device 952 is operatively coupled to system bus 902 by display adapter 950.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

FIG. 7 is a block/flow diagram of an exemplary method for generating binding peptides that can be presented by any given MHC protein, in accordance with embodiments of the present invention.

At block 1001, given a peptide and an MHC protein pair, enable a Reinforcement Learning (RL) agent to interact with and exploit a peptide mutation environment by repeatedly mutating the peptide and observing an observation score of the peptide.

At block 1003, learn to form a mutation policy, via a mutation policy network, to iteratively mutate amino acids of the peptide to obtain desired presentation scores.

At block 1005, generate, based on the desired presentation scores, qualified peptides and binding motifs of MHC Class I proteins.

In conclusion, a deep reinforcement learning system with peptide mutation policies for generating binding peptides that are the same as or at most d amino acids different from a library of peptides are proposed. The system 100 can be used for generating peptides for immunotherapy targeting a particular type of virus or tumor. In the RL environment, the state is an MHC allele sequence and a peptide sequence, the action at each time step is to first choose a position in the input peptide to determine the position of edits (replace the current amino acid at the position with another one) and then determine the type of amino acid at the predicted position. In the RL system, amino acid embeddings are employed followed by a convolutional layer and fully-connected layers to get the allele representation. Bi-directional LSTM is used on top of amino acid embeddings to obtain peptide representation, and a deep neural network is employed as a policy network to learn the conditional probability of different actions given the state.

The reward design is based on the difference of the presentation scores of the peptides before and after mutations (actions). The exemplary embodiments use PepPPO 100 to optimize the DRL model. During the mutation process, if any mutated peptide is already d amino acid different from the starting peptide, the process stops, and the peptide is output as the final peptide. The exemplary embodiments also optionally finetune the policy network on this library of peptides with the similarity constraint enforced. Using the pretrained presentation-score prediction deep model to define reward functions and starting from random peptides, the exemplary embodiments then pretrain a DRL system to learn good peptide mutation policies transforming a given random peptide into a peptide with a high presentation score.

Based on this trained DRL system with pretrained peptide mutation policies, the exemplary methods randomly sample batches of peptides from the provided library and follow the policy network to mutate the peptides. The final mutated peptides for all peptides in the library are output (each peptide in the library might produce several promising mutated peptides satisfying the similarity constraint) and the compiled set of mutated peptides are ranked. The top ranked peptides are used as promising drug candidates targeting the specified virus or tumor for immunotherapy. For improved DRL, the exemplary methods use binding motifs for MHC alleles with experimental data to guide the pre-training of the policy network. For MHC alleles without experimental data, the exemplary methods use binding motifs from the most similar MHC alleles with experimental data to guide the pre-training of the policy network.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, RAM, ROM, an Erasable Programmable Read-Only Memory (EPROM or Flash memory), an optical fiber, a portable CD-ROM, an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for generating binding peptides presented by any given Major Histocompatibility Complex (MHC) protein, the method comprising:
    given a peptide and an MHC protein pair, enabling a Reinforcement Learning (RL) agent to interact with and exploit a peptide mutation environment by repeatedly mutating the peptide and observing an observation score of the peptide;
    learning to form a mutation policy, via a mutation policy network, to iteratively mutate amino acids of the peptide to obtain desired presentation scores; and
    generating, based on the desired presentation scores, qualified peptides and binding motifs of MHC Class I proteins.

2. The method of claim 1, wherein the peptide mutation environment includes a state space, an action space, and a reward function.

3. The method of claim 2, wherein the action space is a multi-discrete action space to optimize the peptide by replacing one amino acid with another amino acid.

4. The method of claim 1, wherein, according to the reward function, only terminal states receive rewards from the peptide mutation environment, a terminal state defined as a state with a maximum time step reached by the RL agent or with a presentation score greater than a predefined threshold.

5. The method of claim 1, wherein the peptide and the MHC protein pair are encoded into a distributed embedding space, and a mapping between the distributed embedding space and the mutation policy is learned by a gradient descent optimization method.

6. The method of claim 1, wherein a diversity-promoting experience buffer is employed to enforce the mutation policy to learn diverse actions by storing the trajectories that result in the qualified peptides.

7. The method of claim 6, wherein, at each iteration, visited state action pairs of mutation trajectories of the qualified peptides are added to the diversity-promoting experience buffer.

8. A non-transitory computer-readable storage medium comprising a computer-readable program for generating binding peptides presented by any given Major Histocompatibility Complex (MHC) protein, wherein the computer-readable program when executed on a computer causes the computer to perform the steps of:
  given a peptide and an MHC protein pair, enabling a Reinforcement Learning (RL) agent to interact with and exploit a peptide mutation environment by repeatedly mutating the peptide and observing an observation score of the peptide;
  learning to form a mutation policy, via a mutation policy network, to iteratively mutate amino acids of the peptide to obtain desired presentation scores; and
  generating, based on the desired presentation scores, qualified peptides and binding motifs of MHC Class I proteins.

9. The non-transitory computer-readable storage medium of claim 8, wherein the peptide mutation environment includes a state space, an action space, and a reward function.

10. The non-transitory computer-readable storage medium of claim 9, wherein the action space is a multi-discrete action space to optimize the peptide by replacing one amino acid with another amino acid.

11. The non-transitory computer-readable storage medium of claim 8, wherein, according to the reward function, only terminal states receive rewards from the peptide mutation environment, a terminal state defined as a state with a maximum time step reached by the RL agent or with a presentation score greater than a predefined threshold.

12. The non-transitory computer-readable storage medium of claim 8, wherein the peptide and the MHC protein pair are encoded into a distributed embedding space, and a mapping between the distributed embedding space and the mutation policy is learned by a gradient descent optimization method.

13. The non-transitory computer-readable storage medium of claim 8, wherein a diversity-promoting experience buffer is employed to enforce the mutation policy to learn diverse actions by storing the trajectories that result in the qualified peptides.

14. The non-transitory computer-readable storage medium of claim 13, wherein, at each iteration, visited state action pairs of mutation trajectories of the qualified peptides are added to the diversity-promoting experience buffer.

15. A system for generating binding peptides presented by any given Major Histocompatibility Complex (MHC) protein, the system comprising:
  a memory; and
  one or more processors in communication with the memory configured to:
    given a peptide and an MHC protein pair, enable a Reinforcement Learning (RL) agent to interact with and exploit a peptide mutation environment by repeatedly mutating the peptide and observing an observation score of the peptide;
    learn to form a mutation policy, via a mutation policy network, to iteratively mutate amino acids of the peptide to obtain desired presentation scores; and
    generate, based on the desired presentation scores, qualified peptides and binding motifs of MHC Class I proteins.

16. The system of claim 15, wherein the peptide mutation environment includes a state space, an action space, and a reward function.

17. The system of claim 16, wherein the action space is a multi-discrete action space to optimize the peptide by replacing one amino acid with another amino acid.

18. The system of claim 15, wherein, according to the reward function, only terminal states receive rewards from the peptide mutation environment, a terminal state defined as a state with a maximum time step reached by the RL agent or with a presentation score greater than a predefined threshold.

19. The system of claim 15, wherein the peptide and the MHC protein pair are encoded into a distributed embedding space, and a mapping between the distributed embedding space and the mutation policy is learned by a gradient descent optimization method.

20. The system of claim 15, wherein a diversity-promoting experience buffer is employed to enforce the mutation policy to learn diverse actions by storing the trajectories that result in the qualified peptides.

* * * * *